United States Patent
Zhu et al.

(10) Patent No.: US 10,419,361 B2
(45) Date of Patent: Sep. 17, 2019

(54) INTERWORKING BETWEEN PHYSICAL NETWORK AND VIRTUAL NETWORK

(71) Applicant: Alibaba Group Holding Limited, Grand Cayman (KY)

(72) Inventors: Xiaoping Zhu, Beijing (CN); Zhiyuan Zhou, Beijing (CN); Na Na, Beijing (CN)

(73) Assignee: Alibaba Group Holding Limited (KY)

( * ) Notice: Subject to any disclaimer, the term of this patent is extended or adjusted under 35 U.S.C. 154(b) by 100 days.

(21) Appl. No.: 15/474,878

(22) Filed: Mar. 30, 2017

(65) Prior Publication Data

US 2017/0289065 A1    Oct. 5, 2017

(30) Foreign Application Priority Data

Mar. 31, 2016  (CN) .......................... 2016 1 0195845

(51) Int. Cl.
*H04L 12/933*    (2013.01)
*H04L 12/741*    (2013.01)
*H04L 12/46*     (2006.01)

(52) U.S. Cl.
CPC .............. *H04L 49/15* (2013.01); *H04L 45/74* (2013.01); *H04L 12/4641* (2013.01)

(58) Field of Classification Search
None
See application file for complete search history.

(56) References Cited

U.S. PATENT DOCUMENTS 8,811,398 B2    8/2014   Schlansker et al.
8,923,149 B2   12/2014   Qu et al.
9,043,792 B1    5/2015   Xu
9,137,153 B2    9/2015   Ding et al.
9,210,079 B2   12/2015   Sridhar et al.
9,276,816 B1    3/2016   Conte et al.
2007/0280243 A1* 12/2007  Wray .................. H04L 12/4633
                                                          370/392

(Continued)

FOREIGN PATENT DOCUMENTS

CN          104702525        6/2015

OTHER PUBLICATIONS

PCT Search Report and Written Opinion dated Jun. 27, 2017 for PCT application No. PCT/US2017/025138, 26 pages.

*Primary Examiner* — Bob A Phunkulh

(74) *Attorney, Agent, or Firm* — Lee & Hayes, P.C.

(57) ABSTRACT

A method and device for interworking between a physical network and a virtual network is provided. The implementations may include creating a network connection container. The network connection container may include a first virtual LAN interface configured to connect to a physical network, a second virtual LAN interface configured to connect to a virtual network, and a virtual extensible LAN interface configured to connect the first virtual LAN interface and the second virtual LAN interface. The implementations may further include configuring corresponding routing information for the network connection container and transmitting packets between the physical network and the virtual network via the network connection container based on the routing information. Thus, the network connection container may be added to various network interfaces to achieve physical network and virtual network interworking.

15 Claims, 10 Drawing Sheets

(56) References Cited

U.S. PATENT DOCUMENTS

| | | | |
|---|---|---|---|
| 2013/0297768 A1* | 11/2013 | Singh | H04L 12/2602 709/224 |
| 2014/0169161 A1 | 6/2014 | Wang et al. | |
| 2014/0169215 A1* | 6/2014 | Rajendran | H04L 41/0806 370/254 |
| 2014/0226820 A1* | 8/2014 | Chopra | H04L 63/0485 380/277 |
| 2014/0325637 A1* | 10/2014 | Zhang | H04L 63/0272 726/15 |
| 2014/0355450 A1* | 12/2014 | Bhikkaji | H04L 47/125 370/237 |
| 2015/0009992 A1* | 1/2015 | Zhang | H04L 49/354 370/392 |
| 2015/0372827 A1* | 12/2015 | Dong | H04L 12/18 370/216 |
| 2015/0381494 A1* | 12/2015 | Cherian | H04L 45/745 370/392 |
| 2015/0381495 A1* | 12/2015 | Cherian | H04L 45/745 370/392 |
| 2016/0006687 A1* | 1/2016 | Tsirkin | H04L 69/324 370/392 |
| 2016/0094650 A1* | 3/2016 | Garcia de Rio | H04L 47/78 709/226 |
| 2016/0226967 A1* | 8/2016 | Zhang | H04L 49/25 |
| 2016/0248601 A1* | 8/2016 | Nomi | H04L 12/4641 |
| 2016/0261496 A1* | 9/2016 | Chang | H04L 12/4633 |
| 2016/0352633 A1* | 12/2016 | Kapadia | H04L 45/64 |
| 2017/0041288 A1* | 2/2017 | Stotski | H04L 61/2061 |
| 2017/0180249 A1* | 6/2017 | Shen | H04L 45/586 |
| 2017/0207992 A1* | 7/2017 | Huang | H04L 12/6418 |

* cited by examiner

INTERWORKING BETWEEN PHYSICAL NETWORK AND VIRTUAL NETWORK

CROSS REFERENCE TO RELATED PATENT APPLICATIONS

This application claims priority to Chinese Patent Application No. 201610195845.X, filed on Mar. 31, 2016, entitled "Method and device for interworking between physical network and virtual network," which is hereby incorporated by reference in its entirety.

TECHNICAL FIELD

The present disclosure relates to the field of computers and particularly relates to a technology for physical networks and virtual network interworking.

BACKGROUND

With the rapid development of Internet technology and the increasing user demand for applications of the Internet, various data centers have been created. Development of virtualization technology makes it possible to achieve a large number of virtual machines (VM) in the data centers. These virtual machines can essentially operate as a physical machine and perform a variety of functions such as Web servers or database servers. Currently, in the data centers, not all servers run on a virtual machine because of performance problems or safety considerations. Users are more willing to place some important applications on a physical machine. However, applications using a database may run on a virtual machine, and the users may access the virtual network via their physical devices. While virtualization brings unprecedented flexibility to service providers, a two-layer structure tends to be fixed and may not easily be applied to the dynamic characteristics of virtual machines. Under the conventional techniques, to achieve communication between a VM of a data center and a VM or a storage device of another data center, users may create a virtual network using extended LAN (Vxlan) technology to connect the VMs.

Vxlan technology creates a two-layer network on a three-layer IP network, and a data header generated by a VM may be transmitted to a remote data center after packaged into an IP header. In the remote data center, the IP header may be removed, and original data packets may be delivered to a target destine. An IP packaging mechanism allows a two-layer broadcasting area to be extended to any number of remote centers and allows different data centers or different parts in the same data center to be in the same two-layer broadcasting area. A Vxlan function normally resides in the host management program and works with the virtual switch management program in conjunction. However, existing implementations of Vxlan may not easily be adapted to a mixture of VMs and physical devices in the same logical layer.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

Implementations of the present disclosure relate to a method and device for interworking between a physical network and a virtual network to solve problems associated with two-layer and three-layer interworking of physical networks and virtual networks.

According to one aspect of the present disclosure, a method for interworking between a physical network and a virtual network may include creating a network connection container. The network connection container may include a first virtual LAN (local area network) interface configured to connect to a physical network, a second virtual LAN interface configured to connect to a virtual network, and a virtual extensible LAN interface configured to connect the first virtual LAN interface and the second virtual LAN interface. The method may further include configuring corresponding routing information for the network connection container and transmitting packets between the physical network and the virtual network via the network connection container based on the routing information.

Further, when the virtual extensible LAN interface includes a three-layer virtual extensible LAN interface, if the first virtual LAN interface receives a first data packet from the physical network, a computing device (e.g., the device) may transmit the packets to the virtual extensible LAN interface based on the routing information. The virtual extensible LAN interface may package the first data packet with a header of virtual scalable LAN data and transmit the packaged first data packet to a bearer network of the virtual network via a corresponding second virtual LAN interface based on the address mapping table.

For example, the routing information includes path information of transmission of the packets between the virtual extensible LAN interface and the first virtual LAN interface.

For example, the transmitting the packet between the physical network and the virtual network via the network connection container based on the corresponding routing information includes: transmitting the packets to the virtual extensible LAN interface based on the routing information when the first virtual LAN interface receives a first data packet from the physical network; packaging by the virtual extensible LAN interface the first data packet with a header of virtual scalable LAN data; and transmitting the packaged first data packet to a bearer network of the virtual network via a corresponding second virtual LAN interface based on the address mapping table.

For example, the transmitting the packaged first data packet to the bearer network of the virtual network via the corresponding second virtual LAN interface includes: determining whether the network connection container includes the second virtual LAN interface corresponding to the bearer network of the virtual network; and in response to a determination that the network connection container includes the second virtual LAN interface corresponding to the bearer network of the virtual network, transmitting the packaged first data packet to the bearer network of the virtual network via the corresponding second virtual LAN interface based on the address mapping table of the virtual extensible LAN interface; or in response to a determination that the network connection container does not include the second virtual LAN interface corresponding to the bearer network of the virtual network, transmitting the packaged first data packet to another network connection container via a virtual interface such that the second virtual LAN interface corresponding to the network connection container transmit the packaged first data packet to the virtual device.

For example, the transmitting packets between the physical network and the virtual network via the network connection container based on the corresponding routing information includes: transmitting the parsed second data packet to the corresponding virtual extensible LAN interface when the second virtual LAN interface receives a second data packet from the virtual network via a bearer network, parsing a header of virtual scalable LAN data of the second data packet; searching the corresponding routing information by the virtual extensible LAN interface based on the address mapping table; and transmitting the parsed second data packet to the physical network via the corresponding first virtual LAN interface.

Further, when the virtual extensible LAN interface includes a two-layer virtual extensible LAN interface, if the first virtual LAN interface receives a first data packet from the physical network, the computing device may transmit the two-layer switch address table to the corresponding virtual extensible LAN interface. The virtual extensible LAN interface may perform a corresponding packaging operation on the first data packet and place the packaged first data packet into a packet queue of a network transmission layer. The network connection container may package the header of first media access control for the packaged first data packet based on the routing information and transmit the first data packet to the bearer network of the virtual network via the second virtual LAN interface.

For example, the creating the network connection container includes: specifying identity identification information of the first virtual LAN interface corresponding to the physical network interworking with the virtual network; and adding into a two-layer switch address table a corresponding relationship between the media access control address of the virtual device corresponding virtual extensible LAN interface and interface information of the second virtual LAN interface.

For example, the transmitting packets between the physical network and the virtual network via the network connection container based on the corresponding routing information includes: transmitting the two-layer switch address table to the corresponding virtual extensible LAN interface when the first virtual LAN interface receives a first data packet from the physical network; performing a corresponding packaging operation on the first data packet by the virtual extensible LAN interface; placing the packaged first data packet into a packet queue of a network transmission layer; packaging a header of first media access control for the packaged first data packet based on the routing information by the network connection container; and transmitting the first data packet to a bearer network of the virtual network via the second virtual LAN interface.

For example, the performing a corresponding packaging operation on the first data packet by the virtual extensible LAN interface includes: packaging into the first data packet a header of virtual scalable LAN data, an IP header of the physical device in the physical network, and a header of user datagram protocol by the virtual extensible LAN interface.

For example, the header of first media access control includes information of media access control address of the virtual device in the virtual network.

For example, the transmitting packets between the physical network and the virtual network via the network connection container based on the corresponding routing information includes: parsing a head of a second data packet, transmitting the parsed second data packet to the virtual extensible LAN interface when the second virtual LAN interface receives a second data packet from the virtual network via a bearer network; removing a header of virtual scalable LAN data from the second data packet by the virtual extensible LAN interface, re-configuring a header of second media access control for the second data packet based on the address mapping table, placing the re-configured second data packet into a packet queue of a data link layer; searching a two-layer switch address table by the network connection container; and transmitting the second data packet to the physical network via the corresponding first virtual LAN interface.

For example, the header of second media access control includes information media access control address of the physical device in the physical network.

According to another aspect of the present disclosure, the implementations further relate to a device for interworking between a physical network and a virtual network. The device may include a creating module configured to create a network connection container. The network connection container may include a first virtual LAN interface configured to connect to the physical network, a second virtual LAN interface configured to connect to the virtual network, and a virtual extensible LAN interface configured to connect the first virtual LAN interface and the second virtual LAN interface. The device may further include a configuring module configured to configure corresponding routing information for the network connection container and a transmission module configured to transmit packets between the physical network and the virtual network via the network connection container based on the routing information.

Further, when the virtual extensible LAN interface may include a three-layer virtual extensible LAN interface, the transmission module may include a first virtual LAN interface configured to transmit the packets to the virtual extensible LAN interface based on the routing information when the first virtual LAN interface receives a first data packet from the physical network. The transmission module may further include the virtual extensible LAN interface configured to package the first data packet with a header of virtual scalable LAN data and transmit the packaged first data packet to a bearer network of the virtual network via a corresponding second virtual LAN interface based on the address mapping table.

Further, when the virtual extensible LAN interface may include a two-layer virtual extensible LAN interface, the transmission module may include a first virtual LAN interface configured to transmit the two-layer switch address table to the corresponding virtual extensible LAN interface when the first virtual LAN interface receives a first data packet from the physical network.

The virtual extensible LAN interface may further perform a corresponding packaging operation on the first data packet and place the packaged first data packet into a packet queue of a network transmission layer.

The device may further include a packaging module configured to package the header of first media access control for the packaged first data packet based on the routing information and transmit the first data packet to the bearer network of the virtual network via the second virtual LAN interface.

Another aspect of the present disclosure provides one or more memories stored thereon computer-executable instructions that, when executed by one or more processors, cause the processor to perform acts comprising:

creating a network connection container including:
- a first virtual LAN interface configured to connect to a physical network,
- a second virtual LAN interface configured to connect to a virtual network, and
- a virtual extensible LAN interface configured to connect the first virtual LAN interface and the second virtual LAN interface;

configuring corresponding routing information for the network connection container; and transmitting packets between the physical network and the virtual network via the network connection container based on the routing information.

For example, the transmitting the packet between the physical network and the virtual network via the network connection container based on the corresponding routing information includes: transmitting the packets to the virtual extensible LAN interface based on the routing information when the first virtual LAN interface receives a first data packet from the physical network; packaging by the virtual extensible LAN interface the first data packet with a header of virtual scalable LAN data; and transmitting the packaged first data packet to a bearer network of the virtual network via a corresponding second virtual LAN interface based on the address mapping table.

Compared with the conventional techniques, the implementations of the present disclosure relate to a method and device for interworking between a physical network and a virtual network. The implementations include creating a network connection container. The network connection container may include a first virtual LAN interface configured to connect to a physical network, a second virtual LAN interface configured to connect to a virtual network, a virtual extensible LAN interface configured to connect the first virtual LAN interface and the second virtual LAN interface; and configuring corresponding routing information for the network connection container. Further, the device may transmit packets between the physical network and the virtual network via the network connection container based on the routing information. Thus, various network interfaces may be added to a network connection container to achieve physical network and virtual network interworking.

Further, when the virtual extensible LAN interface includes a three-layer virtual extensible LAN interface, the first data packet may be transmitted from the physical network to the virtual network and be packaged via the virtual extensible LAN interface with a header of virtual scalable LAN data. The packaged first data packet may be transmitted to a bearer network of the virtual network via a corresponding second virtual LAN interface based on the address mapping table. Further, when the virtual extensible LAN interface includes a two-layer virtual extensible LAN interface, when the first virtual LAN interface receives a first data packet from the physical network, the first virtual LAN interface may transmit the two-layer switch address table to the corresponding virtual extensible LAN interface, perform a corresponding packaging operation on the first data packet by the virtual extensible LAN interface, and place the packaged first data packet into a packet queue of a network transmission layer. The network connection container may package the header of first media access control for the packaged first data packet based on the routing information and transmit the first data packet to the bearer network of the virtual network via the second virtual LAN interface. A three-layer virtual extensible LAN interface and a two-layer virtual extensible LAN interface behave differently to achieve different functions.

BRIEF DESCRIPTION OF THE DRAWINGS

The Detailed Description is described with reference to the accompanying figures. The use of the same reference numbers in different figures indicates similar or identical items.

DETAILED DESCRIPTION

Below in conjunction with the accompanying drawings of the implementations of the present disclosure are described in detail.

Figure 1:
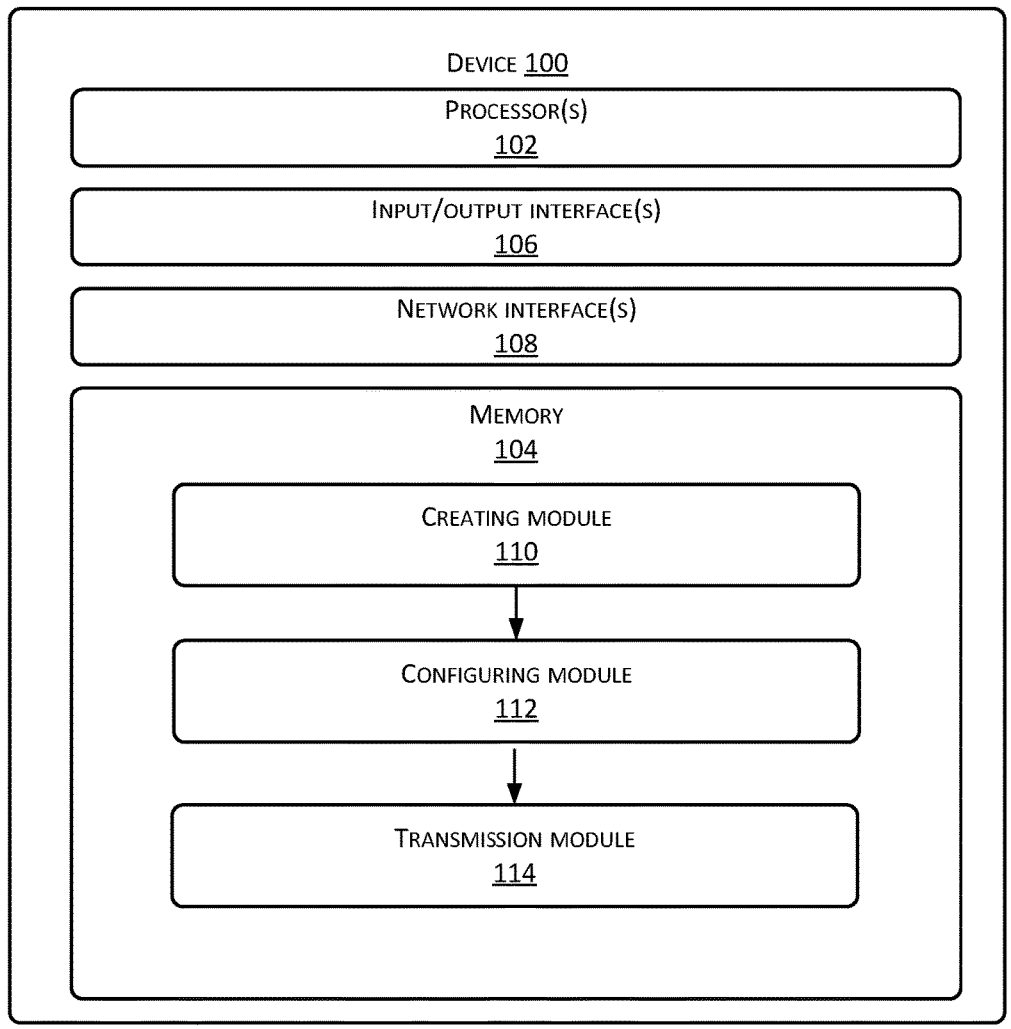
FIG. 1 is a schematic diagram illustrating an apparatus for physical network and virtual network interworking in accordance with an aspect of the present disclosure.

FIG. 1 is a schematic diagram illustrating an apparatus for physical network and virtual network interworking in accordance with an aspect of the present disclosure. A device 100 includes one or more processor(s) 102 or data processing unit(s) and memory 104. The device 100 may further include one or more input/output interface(s) 106, and network interface(s) 108. The memory 104 is an example of computer readable media.

The computer readable media include volatile and non-volatile, removable and non-removable media, and can use any method or technology to store information. The information may be a computer readable instruction, a data structure, and a module of a program or other data. Examples of storage media of a computer include, but are not limited to, a phase change memory (PRAM), a static random access memory (SRAM), a dynamic random access memory (DRAM), other types of RAMs, an ROM, an electrically erasable programmable read-only memory (EEPROM), a flash memory or other memory technologies, a compact disk read-only memory (CD-ROM), a digital versatile disc (DVD) or other optical storage, a cassette tape, a tape disk storage or other magnetic storage devices, or any other non-transmission media, which can be that storing information accessible to a computation device. According to the definition herein, the computer readable media does not include transitory computer readable media (transitory media), for example, a modulated data signal and a carrier.

The memory 104 may store therein a plurality of modules or units including a creating module 110, a configuring module 112, and a transmission module 114. The creating module 110 may be configured to create a network connection container. The network connection container may include a first virtual LAN interface configured to connect to a physical network, a second virtual LAN interface configured to connect to a virtual network, and a virtual extensible LAN interface configured to connect the first virtual LAN interface and the second virtual LAN interface. The configuring module 112 may configure corresponding routing information for the network connection container. The transmission module 114 may transmit packets between the physical network and the virtual network via the network connection container based on the routing information.

The device 100 may include but not limited to a user electronics, a network device, or a combination of a user electronics and a network device via networks. The user electronics may include but not limited to mobile electronics configured to enable human-computer interactions via touch panels. Examples of mobile electronics include smart phones, PDA, etc. The mobile electronics can use any operating system such as android operating system, iOS operating system. The network device may include an electronic device that performs automatic calculation and information processing based on predetermined instructions. The hardware of the network device may include but is not limited to a microprocessor, application specific integrated circuit (ASIC), programmable gate array (the FPGA), digital signal processor (DSP), and embedded devices. The network may include but not limited to the Internet, WAN, MAN, LAN, VPN network, a wireless ad hoc network (Ad Hoc network) and the like. In some implementations, the device 100 may be implemented by scripts that run on the user electronics, the network device, or the combination of user electronics and the network device via the network. In some implementations, skilled in the art should be understood that the above the device 100 is merely an example, other existing or possible future device 100 as applicable to the present disclosure are also within the scope of protection of the present disclosure.

Operations of the above-described devices are continuous. Here, the skilled in the art will appreciate that "continuous" refers to the above-described devices respectively in real-time or according to a preset or timely adjusted operating mode.

The implementations of the present disclosure relate to a method and device for interworking between a physical network and a virtual network. The implementations include creating a network connection container to achieve physical network and virtual network interworking. A function of the network connection container is related to an interface type of the added network connection container.

In implementations, the creating module 110 may be configured to create a network connection container. The network connection container may include a first virtual LAN interface configured to connect to a physical network, a second virtual LAN interface configured to connect to a virtual network, and a virtual extensible LAN interface configured to connect the first virtual LAN interface and the second virtual LAN interface. In addition, the configuring module 112 may configure corresponding routing information for the network connection container.

Figure 2:
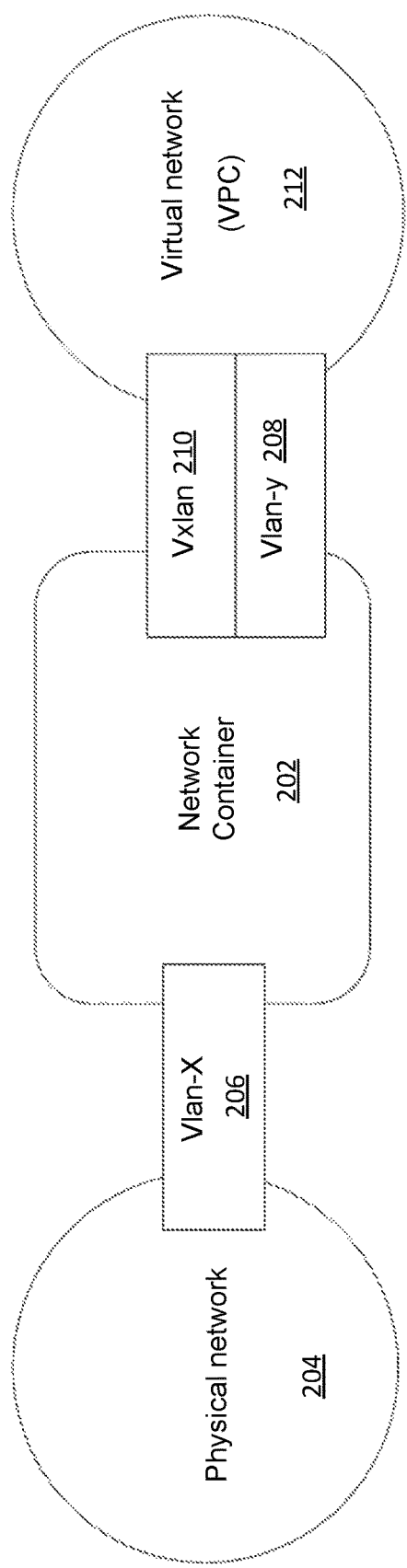
FIG. 2 is a schematic diagram illustrating a connection between a network container and a physical network as well as a virtual network in accordance with an aspect of the present disclosure.

In implementations, FIG. 2 is a schematic diagram illustrating the connection between a network container 202 and a physical network 204 as well as a virtual network 206 in accordance with an aspect of the present disclosure. The network container 202 is connected to the physical network 204 via a first virtual LAN interface (Vlan-x) 206, and to a virtual network (VPC) 212 via a second virtual LAN interface (Vlan-y) 208 and a virtual extensible LAN interface (Vxlan) 210 to achieve physical network and virtual network interworking. The Vlan-x interface 206 is an interface of the physical network 204; the Vlan-y interface 208 is connected to a bearer network of VPC of users. The Vxlan interface 210 is a three-layer or two-layer network interface. For convenience, in the present disclosure, a network connection container and a network container, a first virtual LAN interface and the Vlan-x interface, a second virtual LAN interface and a Vlan-y interface, a virtual extensible LAN interface and a Vxlan interface are used interchangeably, respectively. Corresponding network interfaces may be configured with network containers, and then corresponding routing information may be configured on the network containers. When the Vxlan interface is three-layer, the routing information may include routing information of a three-layer protocol in the network container. In other words, the routing information may include path information of data packet transmission between the Vxlan interface and the Vlan-x interface. When the Vxlan interface is two-layer, the routing information may include path information of data packet transmission between the Vlan-y interface and a virtual network. When the data packet is transmitted from the physical network to the virtual network, the network container may process the data packet and then find the corresponding routing information to enable the data packet to transmit from the physical network to the virtual network to achieve two-layer physical network and virtual network interworking.

One skilled in the art should understand that the network connection container created above is not limited to a newly created network connection container but may include an existing network connection container that is configured with at least one of the Vlan-x interface, the Vlan-y interface, or the Vxlan interface or by adding the corresponding routing information to achieve physical network and virtual network interworking. In addition, the network container may not include the Vlan-y interface, and the network container has a virtual interface such that the data packet may be transmitted via the virtual interface to a network container having the Vlan-y interface.

In implementations, the transmission module 114 may transmit packets between the physical network and the virtual network via the network connection container based on the routing information.

Turning back to the previous implementation, the data packet is transmitted from the physical network to the virtual network via the network container, and the Vlan-x interface receives a data packet from the physical network. In these instances, the transmission module 114 may confirm the interface information of the Vxlan interface and search the configured corresponding routing information or the two-layer switch address table in the network container to transmit the data packet to the Vxlan interface for a corresponding data packaging process. The data packet may be transmitted to the Vlan-y interface of a bearer network and transmitted to the virtual network to achieve data interworking from the physical network to the virtual network. If the Vlan-y interface receives the data packet from the virtual network, the device may parse Vxlan information to acquire Vxlan interface information and transmit the data packet to the Vxlan interface for a corresponding data packet process. The device may search the routing information or the two-layer switch address table to transmit the data packet from the Vxlan interface to corresponding Vxlan interface and to the virtual network to achieve data interworking between the physical network and the virtual network.

In implementations, the virtual extensible LAN interface may include a three-layer virtual extensible LAN interface. The virtual extensible LAN interface includes an address mapping table, which may include mapping information between an Internet protocol address of the virtual device in the virtual network and an Internet protocol address of the physical device in the physical network. The routing information may include path information of the transmission of a packet between the virtual extensible LAN interface and the first virtual LAN interface.

Here, when the Vxlan interface is a three-layer network interface, identify information of Vlan-x interface and the Vlan-y interface may vary. The address mapping table of the Vxlan interface (vm-nc-mac table) may only include a VM in a VPC network. The Vxlan interface is a three-layer network interface, and the external network is connected to the virtual network via an Internet interface. In these instances, an Internet protocol address (IP address) of the physical device of the external network should be known in advance. Further, a vm-nc-mac table is a vm-nc table and includes nc IP address and VM IP address. A nc (node controller) is a host physical machine as the virtual machine. A physical machine may correspond to multiple virtual machines and has a virtual machine switch configured for the virtual machine access. The external network may access the virtual network via three routes, and data packets at the IP layer may be classified to a certain network container. In these instances, the network container may include the Vxlan interface and a data packet that enters the network container corresponding to the route. If the next-hop interface is the Vxlan interface, the data packet may be packaged with a Vxlan header and enter the virtual network.

Figure 3:
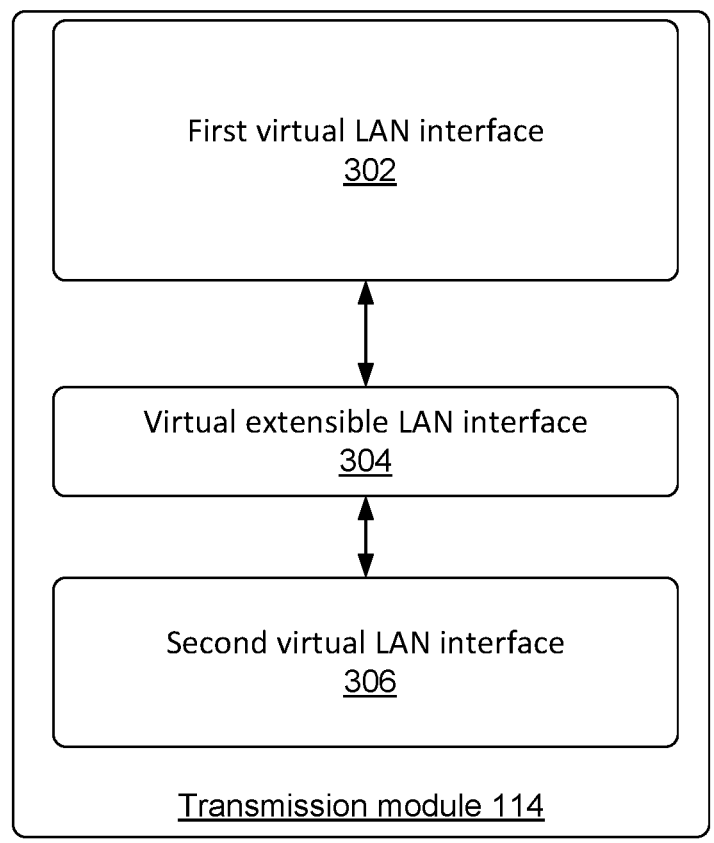
FIG. 3 is a schematic diagram illustrating a transmission module in accordance with an aspect of the present disclosure.

Further, FIG. 3 is schematic diagram illustrating a transmission module in accordance with an aspect of the present disclosure. The transmission module 114 may include a first virtual LAN interface 302, a virtual extensible LAN interface 304, and a second virtual LAN interface 306. To achieve three-layer interworking between the physical network and the virtual network, the first virtual LAN interface 302 may receive the first data packet from the physical network and transmit the first data packet to the virtual extensible LAN interface 304 based on the interface information. The virtual extensible LAN interface 304 may package the first data packet with a header of virtual scalable LAN data and transmit the packaged first data packet to a bearer network of the virtual network via a corresponding second virtual LAN interface 306 based on the address mapping table.

In implementations, the first data packet refers to a data packet that is transmitted from the physical network to the virtual network. The Vlan-x interface may receive the first data packet from the physical network, search the routing table and determine the Vxlan interface based on the corresponding routing information. The first data packet may be transmitted to the Vxlan interface via the network container and packaged with a Vxlan header. Further, the device may use the ID address information of the virtual device corresponding to the physical device of the physical network that is acquired based on the vm-nc table of the Vxlan interface to transmit the packaged first data packet to the Vlan-y interface of the corresponding bearer network. The Vlan-y may transmit the first data packet to the bearer network of the virtual network to be connected to the virtual device of the virtual network.

In implementations, the device may determine whether the network connection container includes the second virtual LAN interface corresponding to the bearer network of the virtual network before transmitting the packaged first data packet to the bearer network of the virtual network via a corresponding second virtual LAN interface. If the network connection container includes the second virtual LAN interface, the device may transmit the packaged first data packet to the bearer network of the virtual network via the corresponding second virtual LAN interface based on the address mapping table of the virtual extensible LAN interface. If the network connection container does not include the second virtual LAN interface, the device may transmit the packaged first data packet to another network connection container via a virtual interface such that the second virtual LAN interface corresponding to the network connection container may transmit the packaged data packet to the virtual device.

Turning back to the previous implementation, there are two scenarios when the first data packet is packaged via the Vxlan interface. If the network container contains the Vlan-y interface of the VPC bearer network, the network container may transmit the packaged data packet after packaged at the Vxlan interface. If the network container does not contain the Vlan-y interface of the VPC bearer network, the packaged data packet may be transmitted to other network containers via the virtual interface after packaged at the Vxlan interface.

Further, as illustrated in FIG. 3, to achieve three-layer interworking between the physical network and the virtual network, the device may parse the header of virtual scalable LAN data of the second data packet when the second virtual LAN interface 306 receives a second data packet from the virtual network via a bearer network. Further, the device may transmit the parsed second data packet to the corresponding virtual extensible LAN interface. Further, the virtual extensible LAN interface 304 may search the corresponding routing information based on the address mapping table and transmit the parsed second data packet to the physical network via the corresponding first virtual LAN interface.

Here, the second data packet refers to a data packet that is transmitted from the virtual network via the bearer network to the physical network, the second data packet is a Vxlan packet in nature, that has to be placed into the network container via the Vlan-y. The Vxlan interface receives Vxlan packet and then determines the header of the Vxlan data to confirm interface information of the Vxlan interface. If the interface is three-layer, the routing information may be directly determined in the network container to confirm output interface information of the Vlan-x interface and the path information of the second data packet to transmit the second data packet from the corresponding Vlan-x interface to the physical network.

In implementations, the virtual extensible LAN interface may include a two-layer virtual extensible LAN interface. The address mapping table of the virtual extensible LAN interface may include the address mapping table that may include the mapping information between a media access control address of the virtual device of the virtual network and a media access control address of the physical device of the physical network. The routing information may include path information for packet transmission between the second virtual LAN interface and the virtual network.

It should be noted that two-layer physical network and virtual network interworking refers to a situation that the physical network and the virtual network are in a two-layer network such as to forward data packets based on a media access control address. In these instances, an Internet protocol address (IP address) of the physical device of the external network should be known in advance. In some implementations, an address mapping table of Vxlan interface (vm-nc-mac table) may include the media access control address of a VM (MAC address) and the MAC address of the PC in the physical network when the Vxlan interface is a three-layer or two-layer network interface. In these instances, vm-nc-mac represents a MAC address that belongs to a VM that is determined based on the IP address of the VM, and the VM may be further determined to locate at a nc based on the IP address of the nc. To achieve two-layer interworking between the physical network and the virtual network, the data packet may be transmitted from the Vlan-y interface of the bearer network, and the next hop from Vlan-y may be determined based on the routing information to transmit the data packet to the corresponding virtual device of the corresponding virtual network based on the corresponding path information. In addition, the vm-nc-mac table also includes Vlan information such that output Vlan information may be acquired based on the vm-nc-mac table during the process of forwarding the data packet to complete the external transmission of the data packet.

When an external physical device (host) requests a MAC address of the virtual device of the virtual network (i.e., the Vlan-x receives an ARP request), the vm-nc-mac table of Vxlan interface may be determined and may answer the corresponding MAC such that subsequent data packets may be transmitted to the gateway (the Vlan-x interface) and transmitted to the corresponding virtual network via the gateway.

Figure 4:
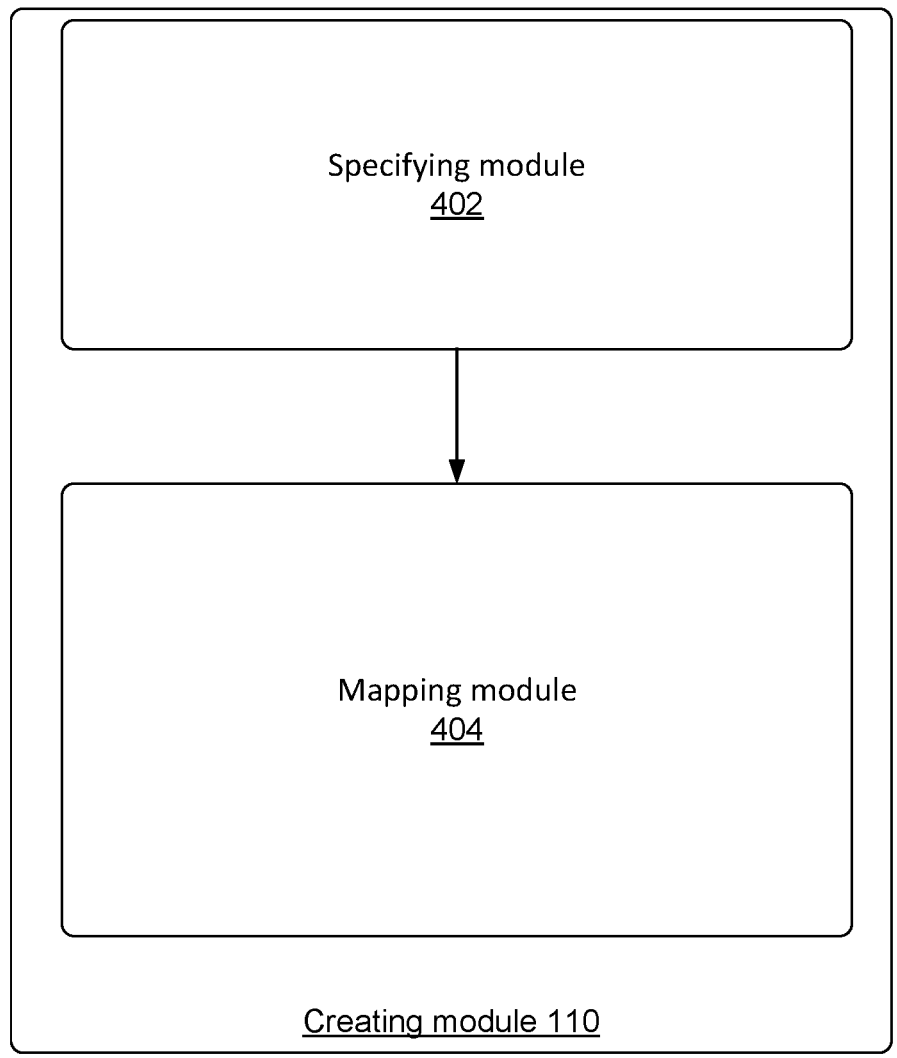
FIG. 4 is a schematic diagram illustrating a creating module in accordance with an aspect of the present disclosure.

In some implementations, the virtual extensible LAN interface may include a two-layer virtual extensible LAN interface. FIG. 4 is a schematic diagram illustrating a creating module in accordance with an aspect of the present disclosure. The creating module 110 may include a specifying module 402 and a mapping module 404. In some implementations, the specifying module 402 may specify identity identification information of the first virtual LAN interface corresponding to the physical network interworking with the virtual network. The mapping module 404 may add into a two-layer switch address table a corresponding relationship between the media access control address of the virtual device corresponding virtual extensible LAN interface and interface information of the second virtual LAN interface.

Here, when the Vxlan interface is a three-layer or two-layer network interface, the identity information (ID) of the Vxlan interface of the physical network is specified for interworking when the Vlan-x interface is created, and the ID of the Vlan-x interface may be different from the ID of the Vlan-y interface of the VPC bearer network. In addition, when the network container is configured with the Vxlan interface, the MAC of the VM corresponding to the Vxlan interface is added to the two-layer switch address table (CAM table) such that the data packet is forwarded via the Vxlan interface to determine the corresponding output Vxlan interface (Vlan-x or Vlan-y) to achieve the transmission of the data packet from the physical network to the virtual network or from the virtual network to the physical network.

As illustrated in FIG. 3, the transmission module 114 may include a first virtual LAN interface 302, a virtual extensible LAN interface 304, and a second virtual LAN interface 306. The virtual extensible LAN interface 304 is a two-layer virtual extensible LAN interface. If the first virtual LAN interface 302 receives the first data packet from the physical network, the first virtual LAN interface 302 may transmit the two-layer switch address table to the corresponding virtual extensible LAN interface. Further, the virtual extensible LAN interface 304 may perform a corresponding packaging operation on the first data packet and place the packaged first data packet into a packet queue of a network transmission layer. The transmission module 114 may further include a packaging module (not shown in FIGs.) configured to package the header of first media access control for the packaged first data packet based on the routing information and transmit the first data packet to the bearer network of the virtual network via the second virtual LAN interface.

Here, searching for the two-layer switch address table (CAM table) results in the two-layer interworking of the physical network and the virtual network. First of all, the Vlan-x interface may receive the first data packet from the physical network, search the interface information of the Vxlan interface, transmit the first data packet to the corresponding Vxlan interface for data packet packaging process, place the packaged first data packet into a packet queue of a network transmission layer (3L), and extract the packaged first data packet from the packet queue to determine the routing information such as to acquire path information of the data packet transmission between the Vlan-y interface and a virtual network and to add a MAC data header to the packaged first data packet. In some implementations, the first header of first media access control (MAC) data header may include information of media access control address of the virtual device in the virtual network. The target MAC may be changed to include the MAC address of the virtual device to complete the data packet transmission to the corresponding virtual device. The packaged data packet may be incorporated with the MAC data header with the target MAC address, and then the data packet may be transmitted to the bearer network of the virtual network to complete the data packet transmission from the physical network to the virtual network.

In implementations, the virtual extensible LAN interface 304 may perform a corresponding packaging operation on the first data packet by packaging, into the first data packet, a header of virtual scalable LAN data, an IP header of the physical device in the physical network, and a header of user datagram protocol.

Here, two-layer physical network and virtual network interworking is implemented by forwarding data packets via the target MAC address.

During the process of forwarding, the data packets are processed to meet transmission requirements. After the Vxlan interface receives data packets, the Vxlan may package the data packets to support packaging manners of IP in IP and MAC in IP to use a packaging way to bear a two-layer network on a three-layer network. The portion of the packet format may include payload/vxlan header/udp header/ip header/ethernet header. One skilled in the art should understand that IP in IP packaging includes inserting an external IP header on the existing IP header, namely, packaging IP in the IP. MAC in IP packaging includes inserting an external IP header on a MAC header. Payload refers to a load of the packet and includes a complete packet. An Ethernet header refers to a MAC address of the gateway, vlan information, and packet protocol type and other information. The Vxlan interface may receive the data packet and package the vxlan header of the data packet to add an external UDP header and IP header and to place the data packet into an L3-layer packet queue after the packaging process.

In implementations, to achieve two-layer interworking between the physical network and the virtual network, as illustrated in FIG. 3, the second virtual LAN interface 306 may receive a second data packet from the virtual network via a bearer network, parse a header of the second data packet, and transmit the parsed second data packet to the virtual extensible LAN interface. The virtual extensible LAN interface 304 may remove the header of virtual scalable LAN data from the second data packet, re-configure a header of second media access control for the second data packet based on the address mapping table, and place the re-configured second data packet into a packet queue of a data link layer. The transmission module 114 may further include a searching module configured to search a two-layer switch address table via the network connection container and to transmit the second data packet to the physical network via the corresponding first virtual LAN interface.

In implementations, the header of second media access control may include information media access control address of the physical device in the physical network. In some implementations, the Vlan-y interface may receive the second data packet from the virtual network via the bearer network and parse the Vxlan data header to determine the corresponding Vxlan interface and to transmit the second packet to the interface Vxlan for an appropriate process. The Vxlan interface may receive the second data packet, remove the Vxlan data header from the external header, search the vm-nc-MAC table based on the internal IP address (i.e., the IP address in payload), and construct a new MAC data header based on search results to change the target MAC to have the MAC address of the physical device (host) of the corresponding physical network. In other words, the target MAC is changed to have the header of second media access control. It should be noted that, in the packaging manner of IP in IP, the MAC data header need to be reconstructed. In the packaging manner of MAC in IP, the internal target MAC is the MAC of the gateway and need to be changed to the MAC address of the target physical device. After the removing process, the reconstructed MAC data header may be placed into a packet queue of a data link layer (L2). Further, the corresponding path information may be acquired by search the CAM table, and the data packet may be transmitted to the corresponding Vlan-x interface and then to the physical device of the physical network to achieve two-layer interworking between the physical network and the virtual network.

In the implementations of the present disclosure, the device for physical network and virtual network interworking may configure a network container with network interfaces including various functions to achieve various functions of the network container and configure the Vxlan interface with various functions to achieve three-layer and/or two-layer physical network and virtual network interworking.

Figure 5:
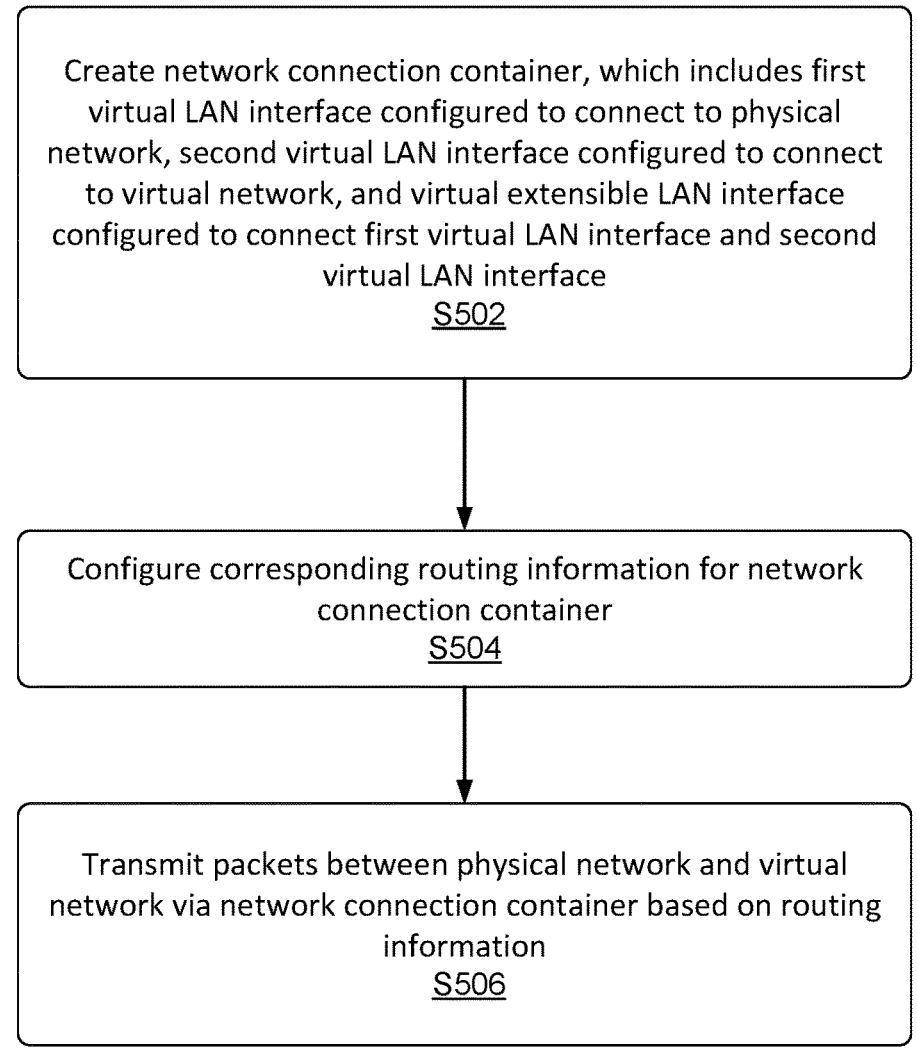
FIG. 5 is a flowchart illustrating a method of physical network and virtual network interworking in accordance with an aspect of the present disclosure.

FIG. 5 is a flowchart illustrating a method of physical network and virtual network interworking in accordance with an aspect of the present disclosure. The method may include step S502, step S504, and step S506. In step S502, the device may create a network connection container. The network connection container may include a first virtual LAN interface configured to connect to a physical network, a second virtual LAN interface configured to connect to a virtual network, and a virtual extensible LAN interface configured to connect the first virtual LAN interface and the second virtual LAN interface. In step S504, the device may configure corresponding routing information for the network connection container. In step S506, the device may transmit packets between the physical network and the virtual network via the network connection container based on the routing information.

Implementations of the present disclosure relate to a method and device for interworking between a physical network and a virtual network. By creating a network connection container, the implementations achieve physical network and virtual network interworking. In some implementations, a function of the network connection container relates to an interface type of the added network connection container.

In step S502, the device may create a network connection container. The network connection container may include a first virtual LAN interface configured to connect to a physical network, a second virtual LAN interface configured to connect to a virtual network, and a virtual extensible LAN interface configured to connect the first virtual LAN interface and the second virtual LAN interface. Further, in step S504, the device may configure corresponding routing information for the network connection container.

In implementations, FIG. 2 is a schematic diagram illustrating the connection between a network container and a physical network as well as a virtual network in accordance with an aspect of the present disclosure. The network container is connected to a physical network via a first virtual LAN interface (Vlan-x) and to a virtual network (VPC) via a second virtual LAN interface (Vlan-y) and a virtual extensible LAN interface (Vxlan) to achieve physical network and virtual network interworking. The Vlan-x interface is an interface of the physical network, the Vlan-y interface connects a bearer network of VPC of users, and the Vxlan interface is a three-layer or two-layer network interface. For convenience, in the present disclosure, a network connection container and a network container, a first virtual LAN interface and Vlan-x interface, a second virtual LAN interface and Vlan-y interface, a virtual extensible LAN interface and Vxlan interface are used interchangeably, respectively. Corresponding network interfaces may be configured to network containers, and then corresponding routing information may be configured to network containers. When the Vxlan interface is three layers, the routing information may include routing information of a three-layer protocol in the network container. In other words, the routing information may include path information of data packet transmission between the Vxlan interface and the Vlan-x interface. When the Vxlan interface is two-layer, the routing information may include path information of data packet transmission between the Vlan-y interface and a virtual network. When the data packet is transmitted from the physical network to the virtual network, the network container may process the data packet and then find the corresponding routing information to enable the data packet to transmit from the physical network to the virtual network to achieve two-layer physical network and virtual network interworking.

One skilled in the art should understand that the network connection container created above is not limited to a newly created network connection container but may include an existing network connection container that is configured with at least one of the Vlan-x interface, the Vlan-y interface, or the Vxlan interface or by adding the corresponding routing information to achieve physical network and virtual network interworking. In addition, the network container may not include the Vlan-y interface; the network container has a virtual interface such that the data packet may be transmitted, via the virtual interface, to a network container having the Vlan-y interface.

In step S506, the device may transmit packets between the physical network and the virtual network via the network connection container based on the routing information.

Turning back to the previous implementation, the data packet is transmitted from the physical network to the virtual network via the network container, and the Vlan-x interface receives a data packet from the physical network. In these instances, the transmission module 114 may confirm the interface information of the Vxlan interface and search, in the network container, the configured corresponding routing information or the two-layer switch address table to transmit the data packet to the Vxlan interface for a corresponding data packaging process. The data packet may be transmitted to the Vlan-y interface of a bearer network and transmitted to the virtual network to achieve data interworking from the physical network to the virtual network. If the Vlan-y interface receives the data packet from the virtual network, the device may parse Vxlan information to acquire Vxlan interface information and transmit the data packet to the Vxlan interface for a corresponding data packet process. The device may search the routing information or the two-layer switch address table to transmit the data packet from Vxlan interface to the corresponding Vxlan interface and then to the virtual network to achieve data interworking between the physical network and the virtual network.

In some implementations, the virtual extensible LAN interface may include a three-layer virtual extensible LAN interface. The virtual extensible LAN interface may include an address mapping table. The address mapping table may include mapping information between an Internet protocol address of the virtual device in the virtual network and an Internet protocol address of the physical device in the physical network. The routing information may include path information of the transmission of a packet between the virtual extensible LAN interface and the first virtual LAN interface.

When the Vxlan interface is a three-layer network interface, identity information of the Vlan-x interface and the Vlan-y interface may vary, and an address mapping table of Vxlan interface (vm-nc-mac table) may include a VM in VPC network. When the Vxlan interface is a three-layer network interface, and when the external network is connected to the virtual network via an Internet interface, an Internet protocol address (IP address) of the physical device of the external network should be known in advance. In these instances, a vm-nc-mac table is a vm-nc table and includes nc IP address and VM IP address. A nc (node controller) is a host physical machine as the virtual machine. A physical machine may correspond to multiple virtual machines and have a virtual machine switch configured for the virtual machine access. The external network may access the virtual network via three routes, and data packets at the IP layer may be classified to a certain network container. In these instances, the network container may include the Vxlan interface and a data packet that enters the network container corresponding to the route. If the next-hop interface is the Vxlan interface, the data packet may be packaged with a Vxlan header and enter the virtual network.

Figure 6:
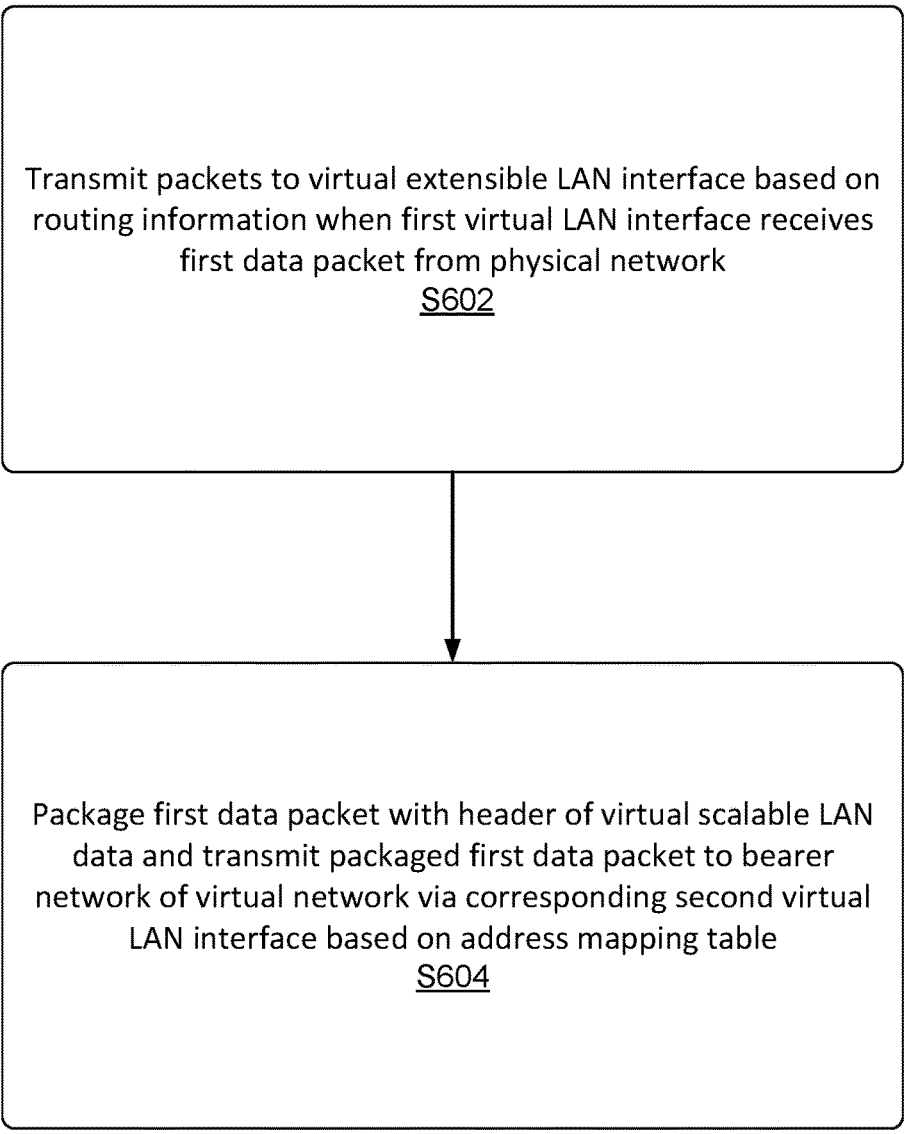
FIG. 6 is another flowchart illustrating a method of receiving by a first virtual LAN interface a first data packet in three-layer interworking in accordance with an aspect of the present disclosure.

Further, FIG. 6 is another flowchart illustrating a method of receiving by a first virtual LAN interface a first data packet in three-layer interworking in accordance with an aspect of the present disclosure. The step S506 may include step S602 and step S604. In step S602, when the first virtual LAN interface receives a first data packet from the physical network, the device may transmit the packets to the virtual extensible LAN interface based on the routing information. In step S604, the virtual extensible LAN interface may package the first data packet with a header of virtual scalable LAN data and transmit the packaged first data packet to a bearer network of the virtual network via a corresponding second virtual LAN interface based on the address mapping table.

In implementations, the first data packet refers to a data packet that is transmitted from the physical network to the virtual network. The Vlan-x interface may receive the first data packet from the physical network, search the routing table, and determine the Vxlan interface based on the corresponding routing information. The first data packet may be transmitted to the Vxlan interface via the network container and packaged with a Vxlan header to use the ID address information of the virtual device corresponding to the physical device of the physical network that is acquired based on the vm-nc table of Vxlan interface to transmit the packaged first data packet to Vlan-y interface of the corresponding bearer network. The Vlan-y may transmit the first data packet to the bearer network of the virtual network to be connected to the virtual device of the virtual network.

In implementations, the device may determine whether the network connection container includes the second virtual LAN interface corresponding to the bearer network of the virtual network before transmitting the packaged first data packet to the bearer network of the virtual network via a corresponding second virtual LAN interface. If the network connection container includes the second virtual LAN interface, the device may transmit the packaged first data packet to the bearer network of the virtual network via the corresponding second virtual LAN interface based on the address mapping table of the virtual extensible LAN interface. If the network connection container does not include the second virtual LAN interface, the device may transmit the packaged first data packet to another network connection container via a virtual interface such that the second virtual LAN interface corresponding to the network connection container may transmit the packaged data packet to the virtual device.

Turning back to the previous implementation, when the first data packet is packaged via the Vxlan interface, there are two scenarios. If the network container contains the Vlan-y interface of the VPC bearer network, the network container may transmit the packaged data packet after packaged at the Vxlan interface. If the network container does not contain the Vlan-y interface of the VPC bearer network, the packaged data packet may be transmitted to other network containers via the virtual interface after packaged at the Vxlan interface.

Figure 7:
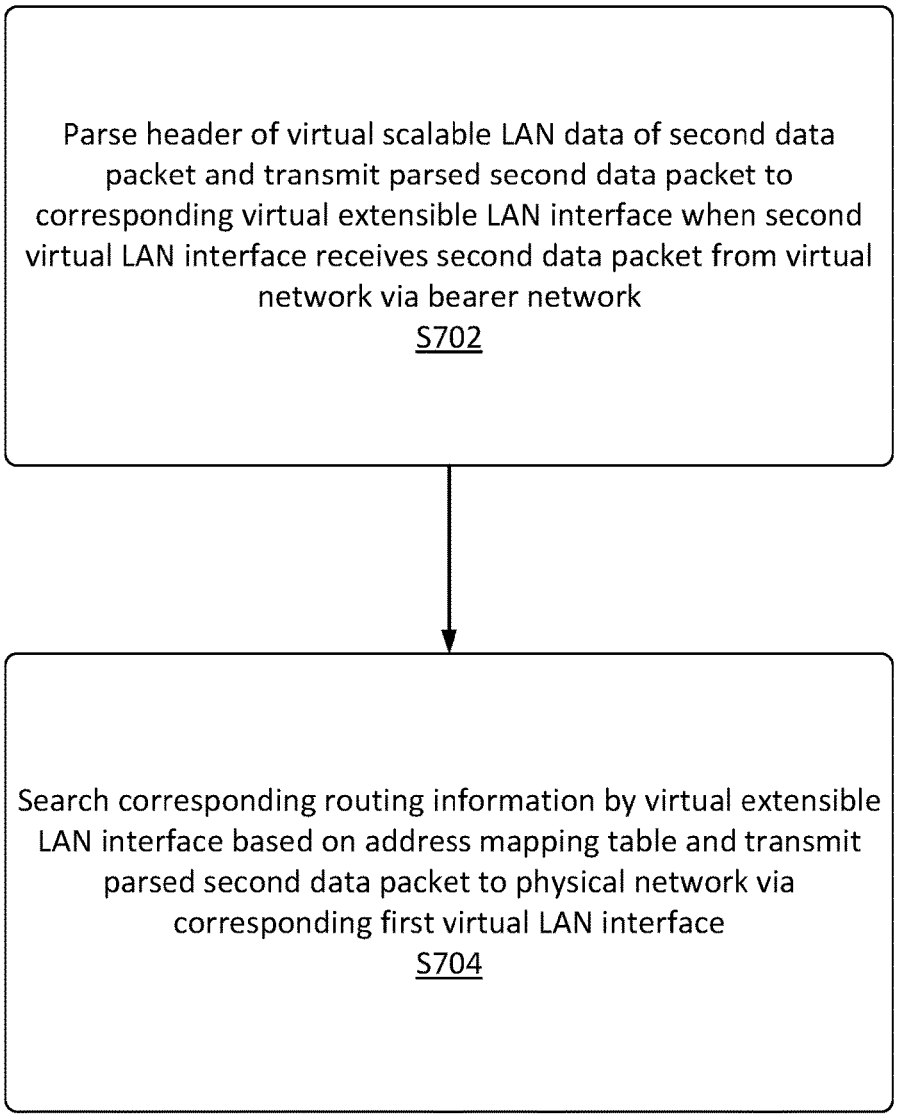
FIG. 7 is yet another flowchart illustrating a method of receiving by a second virtual LAN interface a second data packet in three-layer interworking in accordance with an aspect of the present disclosure.

Further, FIG. 7 is yet another flowchart illustrating a method of receiving by a second virtual LAN interface a second data packet in three-layer interworking in accordance with an aspect of the present disclosure. In step S702, the device may parse the header of virtual scalable LAN data of the second data packet and transmit the parsed second data packet to the corresponding virtual extensible LAN interface when the second virtual LAN interface receives a second data packet from the virtual network via a bearer network. Further, in step S704, the device may search the corresponding routing information by the virtual extensible LAN interface based on the address mapping table and transmit the parsed second data packet to the physical network via the corresponding first virtual LAN interface.

In implementations, the second data packet refers to a data packet that is transmitted from the virtual network via the bearer network to the physical network, the second data packet is a Vxlan packet in nature, that has to be placed into the network container via the Vlan-y. The Vxlan interface receives a Vxlan packet and then determines the header of the Vxlan data to confirm interface information of the Vxlan interface. If the interface is three-layer, the routing information may be directly determined in the network container to confirm output interface information of the Vlan-x interface and the path information of the second data packet to transmit the second data packet from the corresponding Vlan-x interface to the physical network.

In implementations, the virtual extensible LAN interface may include a two-layer virtual extensible LAN interface. The address mapping table of the virtual extensible LAN interface may include an address mapping table that includes the mapping information between a media access control address of the virtual device of the virtual network and a media access control address of the physical device of the physical network. The routing information may include path information for packet transmission between the second virtual LAN interface and the virtual network.

It should be noted that two-layer physical network and virtual network interworking refers to a situation that the physical network and the virtual network are in a two-layer network such as to forward data packets based on a media access control address. An Internet protocol address (IP address) of the physical device of the external network should be known in advance. In some implementations, when the Vxlan interface is a three-layer or two-layer network interface, an address mapping table of the Vxlan interface (vm-nc-MAC table) may include the media access control address of a VM (MAC address) and the MAC address of the PC in the physical network. In these instances, vm-nc-mac represents a MAC address that belongs to a VM that is determined based on the IP address of the VM. The VM may be further determined to locate at a nc based on the IP address of the nc. To achieve two-layer interworking between the physical network and the virtual network, the data packet may be transmitted from the Vlan-y interface of the bearer network, and the next hop from the Vlan-y may be determined based on the routing information to transmit the data packet to the corresponding virtual device of the corresponding virtual network based on the corresponding path information. In addition, the vm-nc-mac table also includes Vlan information such that output Vlan information may be acquired based on the vm-nc-mac table during the process of forwarding the data packet to complete the external transmission of the data packet.

When an external physical device (host) requests a MAC address of the virtual device of the virtual network (i.e., Vlan-x receives an ARP request), the vm-nc-mac table of Vxlan interface may be determined and used to answer the corresponding MAC such that subsequent data packets may be transmitted to the gateway (Vlan-x interface) and transmitted to the corresponding virtual network via the gateway.

Figure 8:
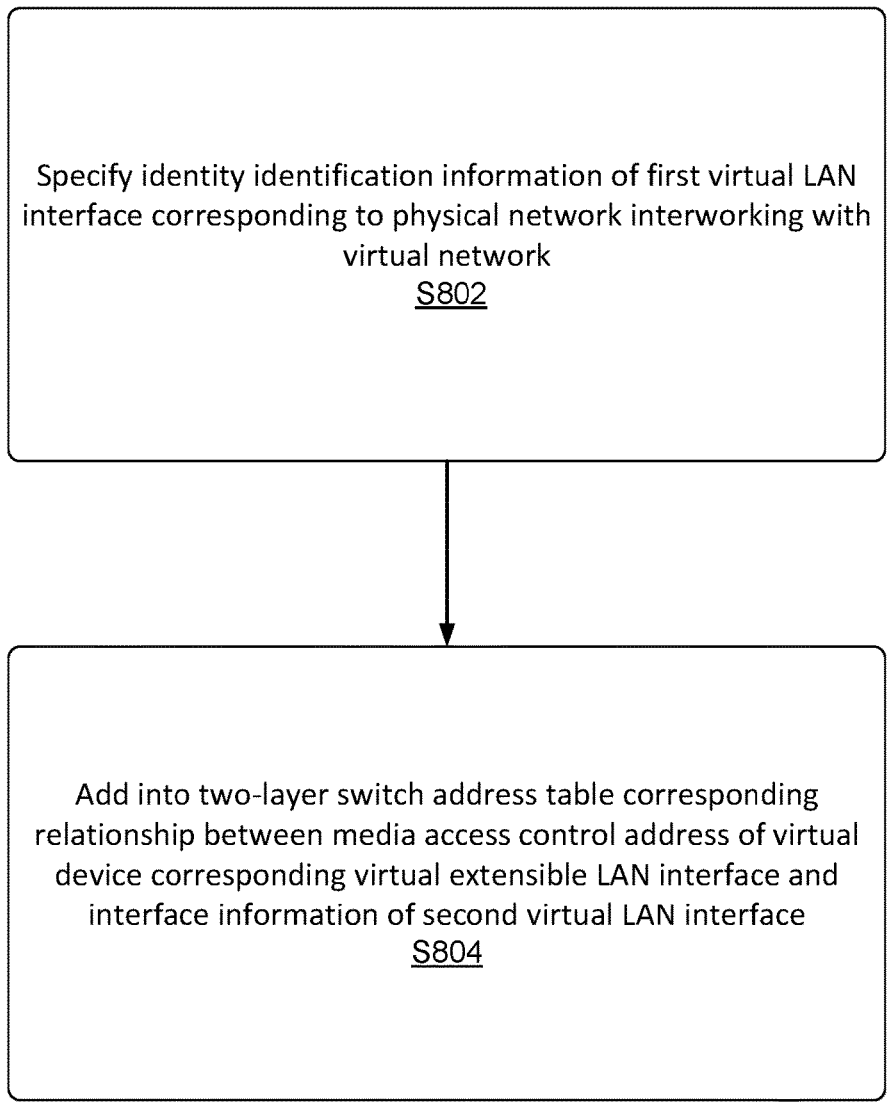
FIG. 8 is yet another flowchart illustrating an operation of S502 in accordance with an aspect of the present disclosure.

In implementations, the virtual extensible LAN interface may include a two-layer virtual extensible LAN interface. FIG. 8 is yet another flowchart illustrating an operation of S502 in accordance with an aspect of the present disclosure. Step S502 includes step S802 and step S804. For example, in step S802, the device may specify identity identification information of the first virtual LAN interface corresponding to the physical network interworking with the virtual network. In step S804, the device may add into a two-layer switch address table a corresponding relationship between the media access control address of the virtual device corresponding virtual extensible LAN interface and interface information of the second virtual LAN interface.

When Vxlan interface is a three-layer or two-layer network interface, the identity information (ID) of the Vxlan interface of the physical network is specified for interworking when the Vlan-x interface is created, and the ID of Vlan-x interface may be different from the ID of Vlan-y interface of the VPC bearer network. In addition, when the network container is configured with the Vxlan interface, the MAC of the VM corresponding to the Vxlan interface is added to the two-layer switch address table (CAM table) such that the data packet is forwarded via the Vxlan interface to determine the corresponding output Vxlan interface (Vlan-x or Vlan-y) to achieve the transmission of the data packet from the physical network to the virtual network or from the virtual network to the physical network.

Figure 9:
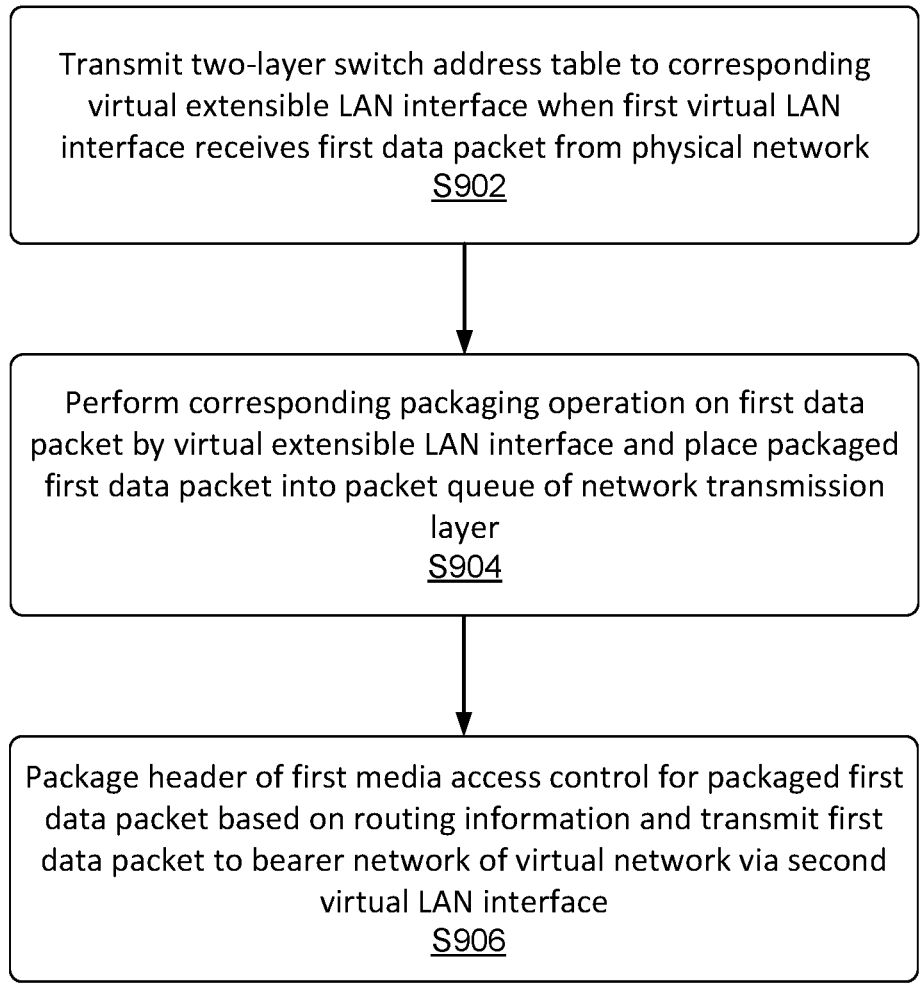
FIG. 9 is yet another flowchart illustrating a method of receiving by a first virtual LAN interface a first data packet in two-layer interworking in accordance with an aspect of the present disclosure.

FIG. 9 is yet another flowchart illustrating a method of receiving by a first virtual LAN interface a first data packet in two-layer interworking in accordance with an aspect of the present disclosure. Step S506 may include step S902, step S904 and step S906. In step S902, when the first virtual LAN interface receives a first data packet from the physical network, the first virtual LAN interface may transmit the two-layer switch address table to the corresponding virtual extensible LAN interface. Further, in step S904, the virtual extensible LAN interface may perform a corresponding packaging operation on the first data packet and place the packaged first data packet into a packet queue of a network transmission layer. In step S906, the virtual extensible LAN interface may package the header of first media access control for the packaged first data packet based on the routing information and transmit the first data packet to the bearer network of the virtual network via the second virtual LAN interface.

Here, searching for the two-layer switch address table (CAM table) results in the two-layer interworking of the physical network and the virtual network. First of all, the Vlan-x interface may receive the first data packet from the physical network, search the interface information of the Vxlan interface, transmit the first data packet to the corresponding Vxlan interface for data packet packaging process, place the packaged first data packet into a packet queue of a network transmission layer (3L), extract the packaged first data packet from the packet queue to determine the routing information such as to acquire path information of the data packet transmission between the Vlan-y interface and a virtual network, and add a MAC data header to the packaged first data packet. In some implementations, the first header of first media access control (Mac data header) may include information of media access control address of the virtual device in the virtual network. The target MAC may be changed to include the MAC address of the virtual device to complete the data packet transmission to the corresponding virtual device. The packaged data packet may be incorporated with the MAC data header with the target MAC address, and then the data packet may be transmitted to the bearer network of the virtual network to complete the data packet transmission from the physical network to the virtual network.

In implementations, a corresponding packaging operation may be performed on the first data packet by the virtual extensible LAN interface by packaging, into the first data packet, a header of virtual scalable LAN data, an IP header of the physical device of the physical device in the physical network, and a header of user datagram protocol.

In implementations, two-layer physical network and virtual network interworking is implemented by forwarding data packets via target MAC. During the process of forwarding, the data packets are processed to meet transmission requirements. After the Vxlan interface receives the data packets, the Vxlan may package the data packets to support packaging manners of IP in IP and MAC in IP to use a packaging way to bear a two-layer network on a three-layer network. A portion of the packet format may include payload/vxlan header/udp header/ip header/ethernet header. One skilled in the art should understand that IP in IP packaging includes inserting an external IP header on the existing IP header, namely, packaging IP in the IP. MAC in IP packaging includes inserting an external IP header on a MAC header. Payload refers to a load of the packet and includes a complete packet. An Ethernet header refers to a MAC address of the gateway, vlan information, and packet protocol type and other information. The Vxlan interface may receive the data packet, package the vxlan header of the data packet to add an external UDP header and IP header, and place the data packet into an L3-layer packet queue after the packaging process.

Figure 10:
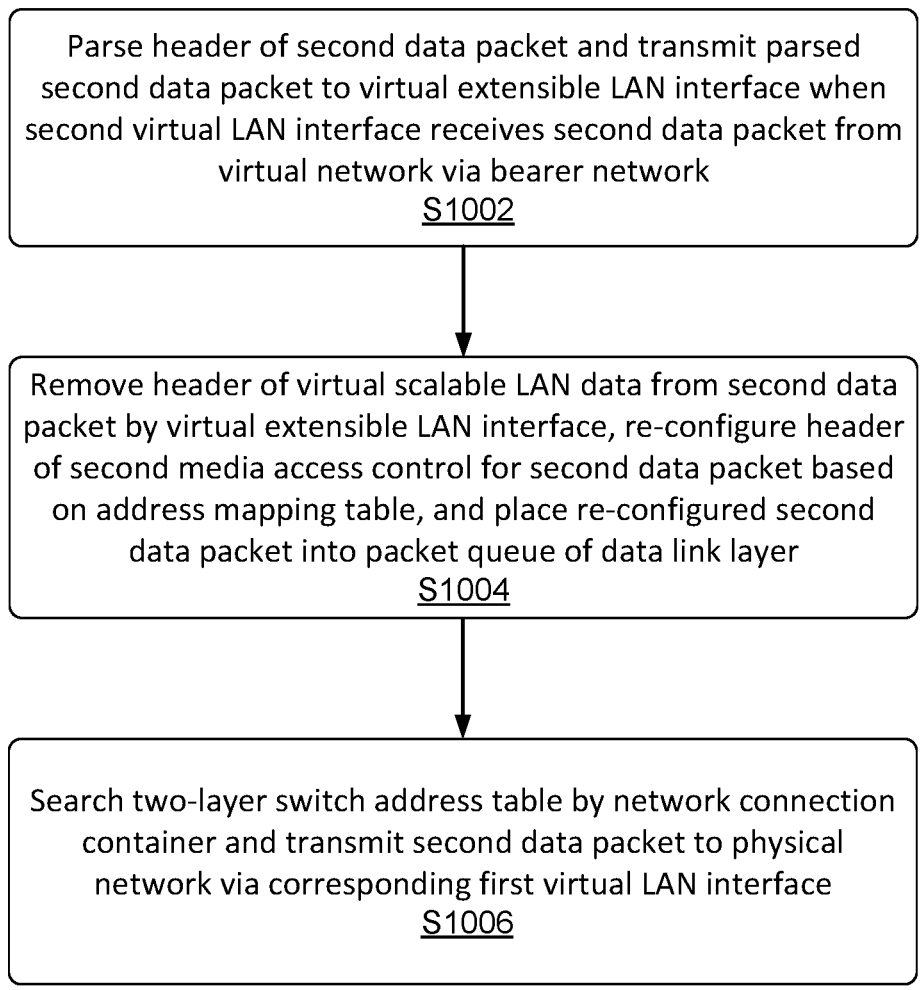
FIG. 10 is yet another flowchart illustrating a method of receiving by a second virtual LAN interface a second data packet in two-layer interworking in accordance with an aspect of the present disclosure.

In implementations, FIG. 10 is yet another flowchart illustrating a method of receiving by a second virtual LAN interface a second data packet in two-layer interworking in accordance with an aspect of the present disclosure. Step S506 may include step S1002, step S1004 and step S1006. In step S1002, when the second virtual LAN interface receives a second data packet from the virtual network via a bearer network, the device may parse a header of the second data packet and transmit the parsed second data packet to the virtual extensible LAN interface. In step 1004, the device may remove the header of virtual scalable LAN data from the second data packet by the virtual extensible LAN interface, re-configure a header of second media access control for the second data packet based on the address mapping table, and place the re-configured second data packet into a packet queue of a data link layer. In step S1006, the device may search a two-layer switch address table by the network connection container and transmit the second data packet to the physical network via the corresponding first virtual LAN interface.

In implementations, the header of second media access control may include information media access control address of the physical device in the physical network. In some implementations, the Vlan-y interface may receive the second data packet from the virtual network via the bearer network and parse the Vxlan data header to determine the corresponding Vxlan interface. The device may transmit the second packet to the interface Vxlan for an appropriate process. The Vxlan interface may receive the second data packet, remove the Vxlan data header from the external header, search the vm-nc-mac table based on the internal IP address (i.e., the IP address in payload), and construct a new MAC data header based on search results to change the target mac to have the MAC address of the physical device (host) of the corresponding physical network. In other words, the target MAC is changed to have the header of second media access control. It should be noted that, in the packaging manner of IP in IP, the MAC data header need to be reconstructed. In the packaging manner of MAC in IP, the internal target MAC is the MAC of the gateway and needs to be changed to the MAC address of the target physical device. After the removing process, the reconstructed MAC data header may be placed into a packet queue of a data link layer (L2). Further, the corresponding path information may be acquired by searching of the CAM table, and the data packet may be transmitted to the corresponding Vlan-x interface and then to the physical device of the physical network to achieve two-layer interworking between the physical network and the virtual network.

Implementations of the present disclosure for physical network and virtual network interworking may configure a network container with network interfaces including various functions to achieve various functions of the network container and configure the Vxlan interface with various functions to achieve three-layer and two-layer physical network and virtual network interworking.

It should be noted that the present disclosure may be entirely implemented by hardware, software, or a combination of hardware and software. For example, the present disclosure may be implemented using a specific integrated circuit (ASIC), a general-purpose computer or any other similar hardware. In some implementations, application software/program may be implemented by a processor to perform the steps or functions described above. Similarly, the application software/programs (including associated data structures) may be stored in a computer-readable recording medium, for example, RAM memory, magnetic or optical drive or floppy disk and similar devices. In addition, some steps or features of this present disclosure may be implemented in hardware including, for example, processors and circuits performing certain steps and/or functions.

In addition, part of this present disclosure may be implemented as a computer program product, e.g., computer program instructions, when executed, by operating the computer, may call or provision methods or technical solutions of the present disclosure. The called program instructions according to the present disclosure may be stored in fixed or removable recording medium, and/or be transmitted via the data stream, radio or other signaling carriers, and/or be stored in working memory of a computing device that runs the computer program instructions. Here, an implementation of the present disclosure includes an apparatus, which includes a memory storing computer program instructions and a processor for executing the program instructions, when executed, methods and/or technical solutions of some implementations may be performed by the apparatus.

Those skilled in the art should understand that the implementations of the present disclosure are not limited to those detailed example implementations. Without conflict, the present disclosure may be achieved by other implementations. Accordingly, the above-described descriptions are merely illustrative, and non-limiting and the scope of the disclosure include the scope of the appended claims. Therefore, all changes intended to fall within the scope of claims and equivalents are within the scope of the present application. Any references to FIGs in claims should not be seen as the right to limit the claims. In addition, apparently "comprising" does not exclude other elements or steps, singular does not exclude a plurality. A plurality of units or means recited in the claims means one or more units/devices or one or more units/devices via hardware and software. The first and the second are used to indicate names rather than any particular order.

What is claimed is:

1. A method for interworking between a physical network and a virtual network, the method comprising:
    configuring routing information for a network connection container, the network connection container including:
        a first virtual LAN interface configured to connect to a physical network;
        a second virtual LAN interface configured to connect to a virtual network; and
        a virtual extensible LAN interface configured to connect the first virtual LAN interface and the second virtual LAN interface, the virtual extensible LAN interface having an address mapping table, the address mapping table including mapping information between an Internet protocol address of a virtual device in the virtual network and an Internet protocol address of a physical device in a physical network, and the routing information includes path information of transmission of the packets between the virtual extensible LAN interface and the first virtual LAN interface; and transmitting packets between the physical network and the virtual network via the network connection container based on the routing information by steps comprising:

transmitting the packets to the virtual extensible LAN interface based on the routing information when the first virtual LAN interface receives a first data packet from the physical network;

packaging by the virtual extensible LAN interface the first data packet with a header of virtual scalable LAN data; and transmitting the packaged first data packet to a bearer network of the virtual network via a corresponding second virtual LAN interface based on the address mapping table.

2. The method of claim 1, wherein the transmitting the packaged first data packet to the bearer network of the virtual network via the corresponding second virtual LAN interface includes:

determining whether the network connection container includes the second virtual LAN interface corresponding to the bearer network of the virtual network; and in response to a determination that the network connection container includes the second virtual LAN interface corresponding to the bearer network of the virtual network, transmitting the packaged first data packet to the bearer network of the virtual network via the corresponding second virtual LAN interface based on the address mapping table of the virtual extensible LAN interface; or in response to a determination that the network connection container does not include the second virtual LAN interface corresponding to the bearer network of the virtual network, transmitting the packaged first data packet to another network connection container via a virtual interface such that the second virtual LAN interface corresponding to the network connection container transmit the packaged first data packet to the virtual device.

3. The method of claim 1, further comprising transmitting packets between the physical network and the virtual network via the network connection container based on the corresponding routing information by steps comprising:

transmitting the parsed second data packet to the corresponding virtual extensible LAN interface when the second virtual LAN interface receives a second data packet from the virtual network via a bearer network, parsing a header of virtual scalable LAN data of the second data packet;

searching the corresponding routing information by the virtual extensible LAN interface based on the address mapping table; and transmitting the parsed second data packet to the physical network via the corresponding first virtual LAN interface.

4. The method of claim 1, wherein:

the virtual extensible LAN interface includes a two-layer virtual extensible LAN interface;

an address mapping table of the virtual extensible LAN interface includes mapping information between a media access control address of a virtual device of a virtual network and a media access control address of a physical device of a physical network; and the routing information includes path information for packet transmission between the second virtual LAN interface and the virtual network.

5. The method of claim 4, wherein the creating the network connection container includes:

specifying identity identification information of the first virtual LAN interface corresponding to the physical network interworking with the virtual network; and adding into a two-layer switch address table a corresponding relationship between the media access control address of the virtual device corresponding virtual extensible LAN interface and interface information of the second virtual LAN interface.

6. The method of claim 5, wherein the transmitting packets between the physical network and the virtual network via the network connection container based on the corresponding routing information includes:

transmitting the two-layer switch address table to the corresponding virtual extensible LAN interface when the first virtual LAN interface receives a first data packet from the physical network;

performing a corresponding packaging operation on the first data packet by the virtual extensible LAN interface;

placing the packaged first data packet into a packet queue of a network transmission layer;

packaging a header of first media access control for the packaged first data packet based on the routing information by the network connection container; and transmitting the first data packet to a bearer network of the virtual network via the second virtual LAN interface.

7. The method of claim 6, wherein the performing a corresponding packaging operation on the first data packet by the virtual extensible LAN interface includes:

packaging into the first data packet a header of virtual scalable LAN data, an IP header of the physical device in the physical network, and a header of user datagram protocol by the virtual extensible LAN interface.

8. The method of claim 6, wherein the header of first media access control includes information of media access control address of the virtual device in the virtual network.

9. The method of claim 4, wherein the transmitting packets between the physical network and the virtual network via the network connection container based on the corresponding routing information includes:

parsing a head of a second data packet, transmitting the parsed second data packet to the virtual extensible LAN interface when the second virtual LAN interface receives a second data packet from the virtual network via a bearer network;

removing a header of virtual scalable LAN data from the second data packet by the virtual extensible LAN interface, re-configuring a header of second media access control for the second data packet based on the address mapping table, placing the re-configured second data packet into a packet queue of a data link layer;

searching a two-layer switch address table by the network connection container; and transmitting the second data packet to the physical network via the corresponding first virtual LAN interface.

10. The method of claim 9, wherein the header of second media access control includes information media access control address of the physical device in the physical network.

11. A device for interworking between a physical network and a virtual network, the device comprising:
one or more processors;
memory;
a configuring module stored in the memory and executable by the one or more processors to cause the one or more processors to configure routing information for a network connection container, the network connection container including:
a first virtual LAN interface that connects to a physical network;
a second virtual LAN interface that connects to a virtual network; and
a virtual extensible LAN interface that connects the first virtual LAN interface and the second virtual LAN interface, the virtual extensible LAN interface having an address mapping table, the address mapping table including mapping information between an Internet protocol address of the virtual device in the virtual network and an Internet protocol address of a physical device in a physical network, and the routing information comprising path information of transmission of a packet between the virtual extensible LAN interface and the first virtual LAN interface; and
a transmission module stored in the memory and executable by the one or more processors to cause the one or more processors to transmit packets between the physical network and the virtual network via the network connection container based on the routing information by steps comprising:
parsing a header of virtual scalable LAN data of a second data packet and transmits the parsed second data packet to the corresponding virtual extensible LAN interface when receiving a second data packet from the virtual network via a bearer network;
searching the corresponding routing information based on the address mapping table; and
transmitting the parsed second data packet to the physical network via the corresponding first virtual LAN interface.

12. The device of claim 3, wherein the transmission module is further executable by the one or more processors to cause the one or more processors to:
transmit the packets to the virtual extensible LAN interface based on the routing information when the first virtual LAN interface receives a first data packet from the physical network;
package the first data packet with a header of virtual scalable LAN data; and
transmit the packaged first data packet to a bearer network of the virtual network via a corresponding second virtual LAN interface based on the address mapping table.

13. The device of claim 12, wherein the virtual extensible LAN interface further:
determines whether the network connection container comprises the second virtual LAN interface corresponding to the bearer network of the virtual network;
in response to a determination that the network connection container comprises the second virtual LAN interface, transmits the packaged first data packet to the bearer network of the virtual network via the corresponding second virtual LAN interface based on the address mapping table of the virtual extensible LAN interface; or
in response to a determination that the network connection container does not comprise the second virtual LAN interface, transmits the packaged first data packet to another network connection container via a virtual interface such that the second virtual LAN interface corresponding to the network connection container transmit the packaged data packet to the virtual device.

14. The device of claim 11, wherein the creating module includes:
a specifying module stored in the memory and executable by the one or more processors to cause the one or more processors to specify identity identification information of the first virtual LAN interface corresponding to the physical network interworking with the virtual network; and
a mapping module stored in the memory and executable by the one or more processors to cause the one or more processors to add into a two-layer switch address table a corresponding relationship between the media access control address of the virtual device corresponding virtual extensible LAN interface and interface information of the second virtual LAN interface.

15. One or more memories stored thereon computer-executable instructions that, when executed by one or more processors, cause the processor to perform acts comprising:
configuring routing information for a network connection container, the network connection container including:
a first virtual LAN interface configured to connect to a physical network;
a second virtual LAN interface configured to connect to a virtual network; and
a virtual extensible LAN interface configured to connect the first virtual LAN interface and the second virtual LAN interface, the virtual extensible LAN interface having an address mapping table, the address mapping table including mapping information between an Internet protocol address of a virtual device in the virtual network and an Internet protocol address of a physical device in a physical network, and the routing information includes path information of transmission of the packets between the virtual extensible LAN interface and the first virtual LAN interface; and
transmitting packets between the physical network and the virtual network via the network connection container based on the routing information by steps comprising:
transmitting the packets to the virtual extensible LAN interface based on the routing information when the first virtual LAN interface receives a first data packet from the physical network;
packaging by the virtual extensible LAN interface the first data packet with a header of virtual scalable LAN data; and
transmitting the packaged first data packet to a bearer network of the virtual network via a corresponding second virtual LAN interface based on the address mapping table.

* * * * *